US007010680B2

(12) United States Patent
Nakaya

(10) Patent No.: US 7,010,680 B2
(45) Date of Patent: Mar. 7, 2006

(54) ROM WRITER HAS SWITCHING DEVICE FOR SWITCHING BETWEEN EXTERNAL START-UP ROM AND DATA ROM TO UPDATE CONTROL PROGRAM IN BUILT-IN WRITABLE ROM

(75) Inventor: Eiji Nakaya, Tatsuno-machi (JP)

(73) Assignee: Seiko Epson Corporation, (JP)

( * ) Notice: Subject to any disclaimer, the term of this patent is extended or adjusted under 35 U.S.C. 154(b) by 497 days.

(21) Appl. No.: 10/290,043

(22) Filed: Nov. 7, 2002

(65) Prior Publication Data

US 2003/0088763 A1    May 8, 2003

(30) Foreign Application Priority Data

Nov. 7, 2001    (JP)    ............................. 2001-341503

(51) Int. Cl.
*G06F 9/00*    (2006.01)

(52) U.S. Cl. ......................................... 713/100; 713/1

(58) Field of Classification Search ................ 713/1; 365/200; 711/102

See application file for complete search history.

(56) References Cited

U.S. PATENT DOCUMENTS 6,057,780 A * 5/2000 Nagakura ................... 340/7.2
6,157,559 A * 12/2000 Yoo ............................ 365/52
6,651,887 B1 * 11/2003 Sehnert ................. 235/462.16

FOREIGN PATENT DOCUMENTS

JP    2001-195246    7/2001

OTHER PUBLICATIONS

Communication from Japanese Patent Office re: counterpart application.

* cited by examiner

*Primary Examiner*—Chun Cao
(74) *Attorney, Agent, or Firm*—Harness, Dickey & Pierce, P.L.C.

(57) ABSTRACT

A program updating method is provided for a built-in ROM. First, a cable 9 is used to connect a connector 5 of an EVA board 1 and a connector 11 of a ROM writer 10. Next, an external start-up program (BIOS) of an external start-up ROM 13 is started to initialize the system. Then, a ROM writer program stored in the external start-up ROM 13 is developed onto a RAM 4 of the system, and the process is moved thereto. Next, the ROM writer program maps a data ROM 14 at addresses where the external startup ROM 13 existed, and copy master data in the data ROM 14 to the RAM 4. The ROM writer program updates a flash ROM 3 with the master data that has been copied to the RAM 4.

4 Claims, 2 Drawing Sheets

US 7,010,680 B2

ROM WRITER HAS SWITCHING DEVICE FOR SWITCHING BETWEEN EXTERNAL START-UP ROM AND DATA ROM TO UPDATE CONTROL PROGRAM IN BUILT-IN WRITABLE ROM

BACKGROUND OF THE INVENTION

1. Technical Field of the Invention

The present invention relates to a ROM writer that updates a control program stored in a built-in ROM of a card PC and a ROM program updating method. More particularly, the invention relates to a ROM writer and a ROM program updating method that can readily update a control program.

2. Conventional Technology

In recent years, PC boards equipped with a CPU, ROM and the like that realize various functions of a computer have been developed. There are demands for PC boards with greater speeds, higher-level functionalities, and smaller sizes, and so-called card PCs in which a CPU, ROM and the like are concentrated and disposed therein have been developed.

A card PC is equipped with a built-in ROM that stores a system control program (BIOS) that realizes predetermined functions of the system.

The ROM that stores the control program can be removed by means of a socket or the like. In this case, when a ROM is updated, only the ROM is removed, a program is written thereon by an independent gang writer, and the ROM is mounted again.

Alternatively, when the ROM is updated without being removed, the OS is started by a control program stored in a built-in ROM, and a ROM update program is operated to update the built-in ROM.

Moreover, a function for updating a built-in ROM may be provided within the built-in ROM.

The use of a socket poses a restriction on the mounting space, and causes poor manageability in terms of maintenance since the system substrate needs to be accessed when the ROM is updated.

Also, when a built-in ROM is to be updated after the OS is started and the ROM update program is operated, or when a built-in ROM is to be equipped with a function to update the built-in ROM, the built-in ROM and the update program within the built-in ROM need to be maintained in perfect condition. For this reason, if data in the built-in ROM is damaged, the OS and the update program may not operate normally.

There is another instance where an overwrite of the update program section may be masked by a boot block scheme. However, the destruction of the program cannot be avoided when an unexpected voltage is applied by an accident or the like. Also, when a boot block is written in for masking, the boot block cannot be updated from the system.

Furthermore, when an built-in ROM is mounted on a so-called card PC, it needs to be entirely disassembled and then reassembled when the ROM is updated, which leads to poor manageability in terms of maintenance.

The present invention has been made in view of the problems described above, and one object of the invention is to provide a ROM writer and a ROM program update method in which a control program that is stored in a built-in ROM of a card PC or the like can be readily updated.

SUMMARY OF THE INVENTION

To solve the problems described above, a ROM writer in accordance with the present invention pertains to a ROM writer for updating a built-in ROM on a system including the built-in ROM that stores a control program, a switching device that switches accesses between the built-in ROM and an external ROM, and a system-side connection device (connector) for a memory bus and an I/O bus, the ROM writer comprising: a writer-side connection device (connector) that performs connection with the system-side connection device; a control circuit that realizes a predetermined function; an external start-up ROM that stores an external start-up program (BIOS) that externally starts up the system and an update program for updating the built-in ROM; a data ROM that stores master data of the built-in ROM; and a writer ROM switching device that switches between the external start-up ROM and the data ROM.

Also, the invention can further be equipped with a display device that displays an updating condition of the data in the built-in ROM.

Further, a ROM program updating method in accordance with the present invention pertains to a program updating method for a built-in ROM on a system including the built-in ROM that stores a control program, a RAM that temporarily stores predetermined data, a switching device that switches accesses between the built-in ROM and an external ROM, and a system-side connection device (connector) for a memory bus and an I/O bus, the program updating method comprising: connecting the system-side connection device with a connection device of a ROM writer; starting an external start-up program (BIOS) in an external start-up ROM of the ROM writer and initializing the system; developing a ROM update program stored in the external start-up ROM onto the RAM of the system; switching the external start-up ROM with a data ROM that stores master data of the built-in ROM and mapping the data ROM at an address of the RAM where the external start-up ROM existed; copying the master data in the data ROM to the RAM; switching accesses by a switching device on the system between the built-in ROM and the external ROM; mapping the built-in ROM at an address where the external start-up ROM existed; and updating the built-in ROM with the master data that has been copied in the RAM.

Also, when the external start-up program in the external start-up ROM of the ROM writer is started to initialize the system, only the minimum functions required upon updating may be simply initialized.

With the ROM writer and the ROM program updating method in accordance with the present invention, even when the built-in ROM of the system is placed in an erase state, or the data in the ROM is modified or destroyed, the data can be updated while the ROM is kept mounted on the system. As a result, the number of updating steps and the cost can be lowered, and the manageability in terms of maintenance can be improved.

Also, since the system on which the ROM is mounted is connected to the ROM writer by a connector, the system does not have to be completely disassembled when an update is performed, and therefore the manageability in maintenance is improved.

Furthermore, in its configuration, data on the ROM is rewritten on the system. Since the OS does not have to be started or the data is not required to be loaded from a disk apparatus, an update for the ROM can be performed without regard to the equipment configuration or the software configuration, and therefore the processing time can be shortened.

DETAILED DESCRIPTION OF THE PREFERRED EMBODIMENTS

Descriptions are made below with reference to the accompanying drawings.

First, an example of the structure of a ROM writer in accordance with an embodiment of the present invention is described.

Figure 1:
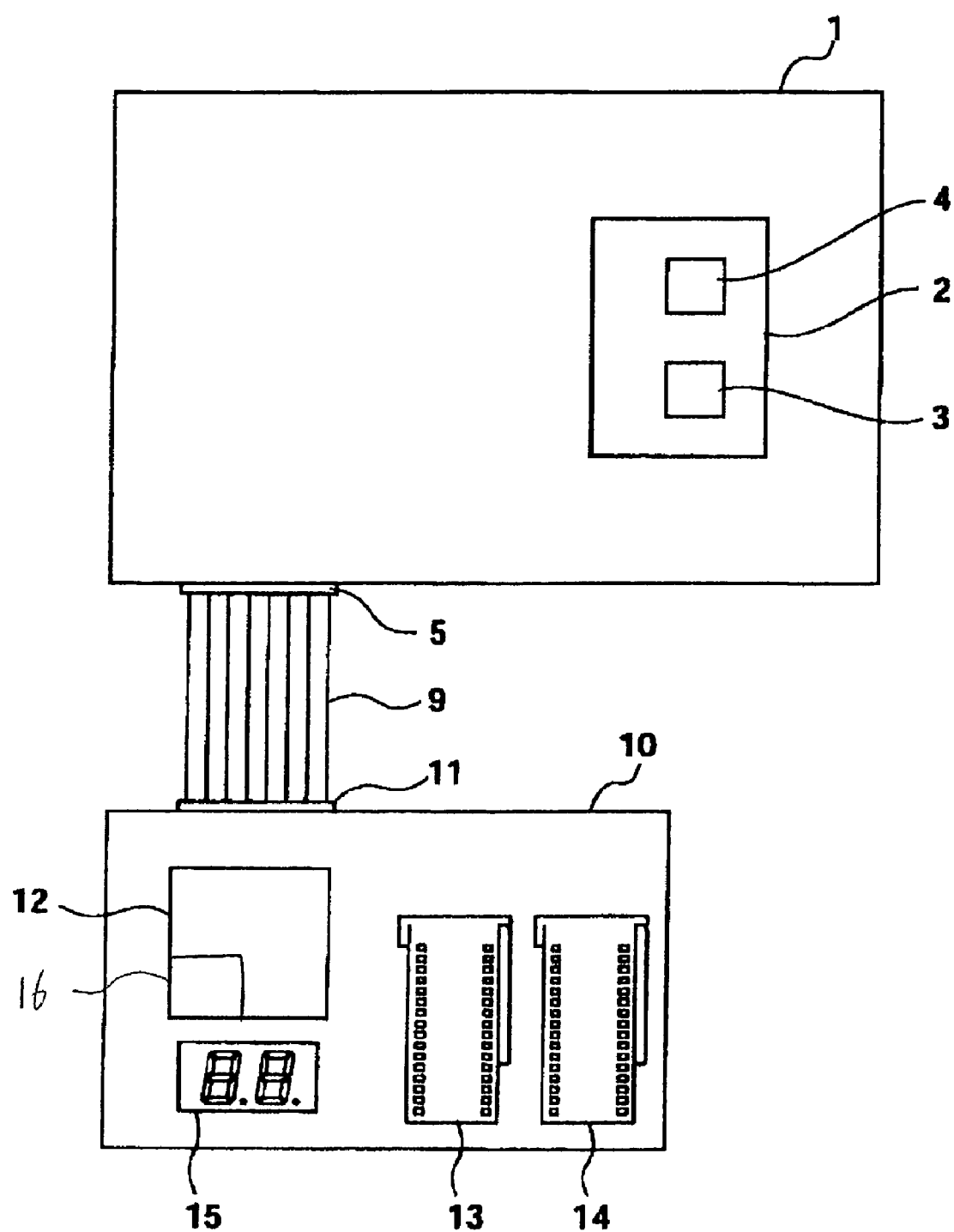
FIG. 1 shows an example of the structure of a ROM writer in accordance with an embodiment of the present invention.

FIG. 1 shows an example of the structure of a ROM writer in accordance with an embodiment of the present invention.

FIG. 1 shows a card PC 2 that is mounted on a system such as an EVA board 1; a flash ROM (built-in ROM) 3 that stores a system control program (BIOS) that realizes predetermined functions of the system, and is mounted on the card PC 2; a RAM 4 that stores a developed program; a ROM writer 10 that updates the control program in the flash ROM 3; and a cable 9 that connects a connector 5 of the EVA board 1 and a connector 11 of the ROM writer 10 to thereby connect memory buses and I/O buses of each. Although not shown in the drawings, the system is provided with an inner system switch mechanism that switches the accesses between an external ROM of the ROM writer 10 and the flash ROM 3 within the system.

The ROM writer 10 is provided with a control circuit 12 that realizes predetermined functions, an external start-up ROM 13 that stores an external start-up program (BIOS) and a ROM writer (updating) program, a data ROM 14 that stores ROM master data, a two-digit (for example) LED display device 15 that displays an update status of the ROM data, and a writer ROM switching mechanism (not shown) that switches the external start-up ROM 13 and the data ROM 14.

Next, a method of updating the program stored in the flash ROM using the above-described ROM writer will be described.

Figure 2:
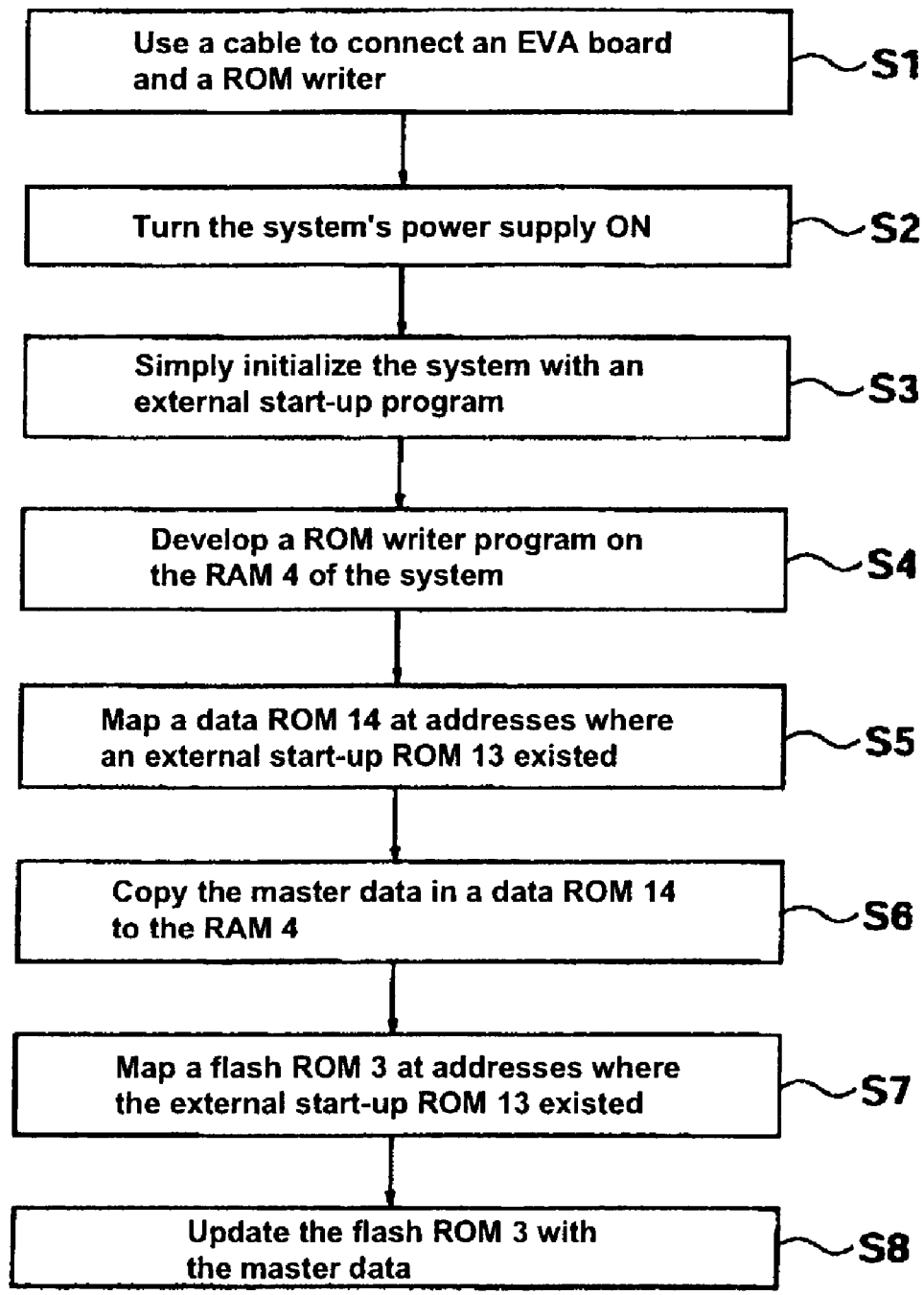
FIG. 2 shows a flowchart of a method for updating a program of a flash ROM.

FIG. 2 shows a flowchart of a method of updating the program stored in the flash ROM.

Referring to FIG. 2, first, the cable 9 (see FIG. 1) is used to connect the connector 5 of the EVA board 1 (see FIG. 1) and the connector 11 of the ROM writer 10 (see FIG. 1) (step 1).

Here, by the control of the control circuit 12 of the ROM writer 10 (see FIG. 1), a direction signal is transmitted from the ROM writer 10 to the card PC 2, and the power supply of the system is turned ON (step 2).

Next, the external start-up program (BIOS) of the external start-up ROM 13 (see FIG. 1) is started to simply initialize the system (for example, the CPU, RAM, communication ports, etc.) (Step 3).

Then, the ROM writer program stored in the external start-up ROM 13 is developed onto the RAM 4 (see FIG. 1) of the system, and the process is moved thereto (step 4).

Next, the ROM writer program uses the writer ROM switching mechanism to map the data ROM 14 (see FIG. 1) at addresses where the external start-up ROM 13 existed (step 5), and copy the master data in the data ROM 14 to the RAM 4 (step 6).

Then, by using the system switching mechanism, the flash ROM 3 (see FIG. 1) is mapped at addresses where the external start-up ROM 13 existed (step 7), and the flash ROM 3 is updated with the master data that has been copied to the RAM 4 (step 8). It is noted that the system switching may be performed by the ROM writer program that sends a control signal to the control circuit 12 of the ROM writer 10 to stop the generation of direction signals.

The status of the data updating described above is output to a communication port of the system, and displayed on the LED display device 15 of the ROM writer 10 (see FIG. 1). This display may be started with, for example, a count of "0" and may be completed when the count reaches "88". Also, when an error occurs during the updating operation, it may display, for example, "EE".

As is clear from the above description, in accordance with the present invention, even when the flash ROM is placed in an erase state by some cause, or a modification or destruction of the data in the ROM occurs, the data can be updated while the flash ROM is kept mounted on the system. As a result, the number of updating steps and the cost can be lowered, and the manageability in terms of maintenance can be improved.

Also, when a system such as the EVA board that has a built-in flash ROM is equipped with an interface connector to the ROM writer, the system does not have to be completely disassembled, and maintenance can be more readily conducted.

Furthermore, in its configuration, data is rewritten on the system. Since the OS does not have to be started, or the data is not required to be loaded from a disk apparatus, an update for the ROM can be performed without regard to the equipment configuration or the software configuration, and the processing time can be shortened to about 10 seconds.

The entire disclosure of Japanese Patent Application No. 2001-341503is incorporated by reference herein.

What is claimed is:

1. A ROM writer for updating a built-in writable ROM on a system including the built-in writable ROM that stores a control program, a switching device that switches access between the built-in writable ROM and an external ROM, and a system-side connection device for a memory bus and an I/O bus, the ROM writer comprising:

a writer-side connection device that connects with the system-side connection device;

a control circuit that realizes a predetermined function;

a first external ROM that stores an external start-up program that externally starts up the system and an update program for updating the built-in writable ROM;

a second external ROM that stores master data for the built-in writable ROM; and a writer ROM switching device that switches between the first external ROM and the second external ROM.

2. The ROM writer according to claim 1, further comprising a display device that displays an updating condition of the data in the built-in writable ROM.

3. A program updating method for a built-in writable ROM on a system including the built-in writable ROM that stores a control program, a RAM that temporarily stores predetermined data, a switching device that switches access between the built-in writable ROM and an external ROM, and a system-side connection device for a memory bus and an I/O bus, the program updating method for a built-in writable ROM comprising:

connecting the system-side connection device with a connection device of a ROM writer;

starting an external start-up program in a first external ROM of the ROM writer and initializing the system;

developing a ROM update program stored in the first external ROM on the RAM of the system;

switching the first external ROM with a second external ROM that stores master data for the built-in writable ROM and mapping the second external ROM at addresses of the RAM where the first external ROM existed;

copying the master data within the second external ROM onto the RAM;

switching access by a switching device of the system between the built-in writable ROM and the second external ROM;

mapping the built-in writable ROM at addresses where the first external ROM existed; and updating the built-in writable ROM with the master data that has been copied in the RAM.

4. The program updating method for a built-in writable ROM on a system according to claim 3, wherein, when the external start-up program in the first external ROM of the ROM writer is started to initialize the system, a minimum number of functions required upon updating are initialized.

* * * * *